United States Patent [19]
Okaniwa

[11] Patent Number: 5,667,880
[45] Date of Patent: Sep. 16, 1997

[54] ELECTROCONDUCTIVE ANTIREFLECTION FILM

[75] Inventor: Masayuki Okaniwa, Ohmiya, Japan

[73] Assignee: Fuji Photo Optical Co., Ltd., Saitama-ken, Japan

[21] Appl. No.: 449,804

[22] Filed: May 24, 1995

Related U.S. Application Data

[63] Continuation of Ser. No. 93,409, Jul. 19, 1993, abandoned.

[30] Foreign Application Priority Data

Jul. 20, 1992 [JP] Japan ................... 4-215422
Jul. 20, 1992 [JP] Japan ................... 4-215423

[51] Int. Cl.$^6$ ........................ B32B 9/00
[52] U.S. Cl. ............... 428/212; 428/688; 428/689; 428/213; 428/216; 428/426; 428/704; 428/702; 428/918; 359/359; 359/585; 359/885
[58] Field of Search .................. 428/212, 688, 428/689, 34.4, 918, 702, 704, 216, 213, 426, 432; 359/359, 585, 586, 589, 885

[56] References Cited

U.S. PATENT DOCUMENTS

| | | | |
|---|---|---|---|
| 3,432,225 | 3/1969 | Rock | 359/587 |
| 3,781,090 | 12/1973 | Sumita | 359/587 |
| 3,960,441 | 6/1976 | Kamiya | 359/587 |
| 4,645,721 | 2/1987 | Arakawa | 428/690 |
| 4,696,548 | 9/1987 | Veno | 350/338 |
| 5,076,674 | 12/1991 | Lynam | 359/603 |
| 5,091,244 | 2/1992 | Bionard | 428/698 |
| 5,105,310 | 4/1992 | Dickey | 359/586 |
| 5,147,125 | 9/1992 | Austin | 359/359 |
| 5,268,779 | 12/1993 | Shigeta | 359/67 |

FOREIGN PATENT DOCUMENTS 1100257  1/1989  Japan.

*Primary Examiner*—Patrick Ryan
*Attorney, Agent, or Firm*—Loeb & Loeb LLP

[57] ABSTRACT

An electroconductive antireflection film with a laminated structure is composed of at least four oxide layers, including a plurality of high-refractive-index layers and a plurality of low-refractive-index layers, at least one of the high-refractive-index layers serving as a transparent electroconductive layer and one of the low-refractive-index layers serving as a surface layer.

3 Claims, 5 Drawing Sheets

ELECTROCONDUCTIVE ANTIREFLECTION FILM

This is a continuation of application Ser. No. 08/093,409 filed on Jul. 19, 1993, now abandoned.

BACKGROUND OF THE INVENTION

1. Field of the Invention

The present invention relates to an electroconductive antireflection film with proper electroconductivity and sufficient capability of diminishing the reflection of light therefrom.

2. Discussion of Background

A transparent electroconductive film is attached to the surface of a glass screen panel of a television set and a display terminal of a computer for the purpose of avoiding the malfunction and adhesion of dust to the glass screen, which result from electrostatic charge deposited on the glass screen. When the transparent electroconductive film is attached to the glass screen, however, the reflectance of the glass screen is increased, which makes it difficult to see the images formed on the glass screen. This is because there is a big difference between the refractive index of the transparent electroconductive film and that of the glass screen. Therefore, this kind of transparent electroconductive film is required to have not only proper electroconductivity, but also the capability of diminishing the reflection of light therefrom.

The conventional electroconductive antireflection film has a laminated structure, for example, with three layers of an $MgF_2$ layer, an $In_2O_3$ layer and an $Al_2O_3$ or $CeF_3$ layer which are successively laminated on a substrate in this order, as proposed in "Optics", Katsube et al., Vol. 7, No. 6, 250–254 (1978); with four layers of an ITO layer, an $MgF_2$ layer, an ITO layer and an $MgF_2$ layer which are successively laminated on a substrate in this order, as disclosed in Japanese Laid-Open Patent Application 61-168899; and with four layers of an ITO layer, an $MgF_2$ layer, a thin layer with a refractive index ranging from 2.05 to 2.2 and an $MgF_2$ layer which are successively laminated on a substrate in this order, as disclosed in Japanese Patent Publication 4-15443.

However, the above-mentioned conventional transparent electroconductive films have the shortcomings that they are easily impaired because of insufficient wear resistance, and the films are susceptible to moisture in the air because of poor environmental stability, so that a peak shift in the spectral reflectance characteristics is produced by the change in humidity depending on the natural environment and the operating environment around the transparent electroconductive film. As a result, a delicate change is observed in the color of light slightly reflected from the glass screen covered with the conventional transparent electroconductive film, for example, from green to red-tinged green, or from green to blue-tinged green. Since the eye is sensitive to such delicate change in color, the reliability of the quality of the transparent electroconductive film is degraded when a peak shift of the spectral reflectance characteristics is produced.

In addition, to successfully attain the capability of preventing the light reflection, the electroconductive antireflection film is required to have at least four layers. The capability of preventing the light reflection is unsatisfactory when the three-layers laminated film is employed. In the structures of the previously mentioned conventional transparent electroconductive films comprising four or more layers, the ITO layer serving as a transparent electroconductive layer is applied over a substrate, namely, the ITO layer is situated at the lowest position in the laminated film. In such a structure, a ground electrode is previously provided on the substrate, and a part of the ground electrode is subjected to masking and thereafter the ITO thin layer is formed on the substrate, thereby attaining the electric connection between the ITO thin layer and the ground electrode.

However, the masking of the ground electrode prior to the deposition of ITO may be troublesome, and necessity of the formation of the earth electrode may restrict the design of the electroconductive antireflection film. Furthermore, the general-purpose properties are lacking in a glass sheet covered with the conventional electroconductive antireflection film, thereby restricting the application of the thus obtained glass sheet.

SUMMARY OF THE INVENTION

Accordingly, an object of the present invention is to provide an electroconductive antireflection film with improved environmental stability and wear resistance.

The above-mentioned object of the present invention can be achieved by an electroconductive antireflection film with a laminated structure comprising at least four oxide layers which comprise a plurality of high-refractive-index layers and a plurality of low-refractive-index layers, at least one of the high-refractive-index layers serving as a transparent electroconductive layer and one of the low-refractive-index layers serving as a surface layer.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

In an electroconductive antireflection film of the present invention, four or more oxide layers comprising a plurality of high-refractive-index layers and a plurality of low-refractive-index layers are laminated. At least one of the high-refractive-index layers serves as a transparent electroconductive layer. It is preferable to provide the above-mentioned high-refractive-index layer serving as a transparent electroconductive layer just on the substrate or immediately under the surface layer.

In the case where the high-refractive-index-layer formed immediately on the substrate serves as a transparent electroconductive layer, electrical connection between the transparent electroconductive layer and the ground electrode previously provided on the substrate can easily be ensured. In this case, a dielectric layer comprising a dielectric oxide (hereinafter referred to as a dielectric oxide layer) may be interposed between the substrate and the transparent electroconductive layer. The transparent electroconductive layer can electrically be connected to the ground electrode via the dielectric oxide layer in this embodiment.

In the case where the transparent electroconductive layer is provided immediately under the surface layer, the ground electrode may be provided on the surface layer, thereby achieving the electric connection between the transparent electroconductive layer and the ground electrode without the previous provision of the ground electrode on the substrate.

Figure 1:
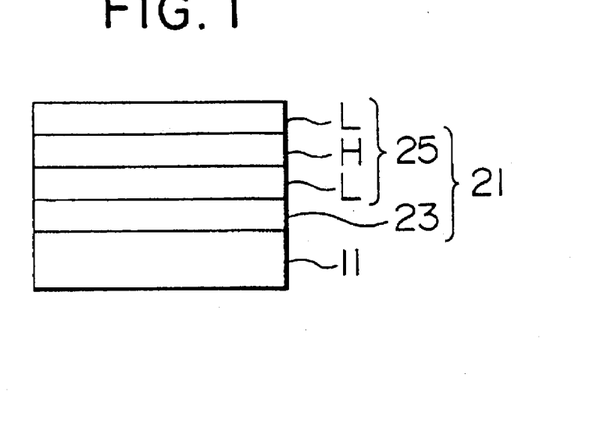
FIGS. 1 through 6 are schematic cross-sectional views showing embodiments of an electroconductive antireflection film of the present invention.

FIG. 1 is a schematic cross-sectional view of a first embodiment of the electroconductive antireflection film. As shown in FIG. 1, an electroconductive antireflection film 21 is provided on a substrate 11. The electroconductive antireflection film 21 comprises a transparent electroconductive layer 23 formed immediately on the substrate 11, and an alternate laminated material 25 comprising a low-refractive-index layer (hereinafter referred to as an L-layer) and a high-refractive-index layer (hereinafter referred to as an H-layer). In this embodiment, the L-layer, the H-layer and the L-layer are successively overlaid in this order on the transparent electroconductive layer 23. Further, a laminated unit in which the L-layer is overlaid on the H-layer (hereinafter referred to as an H-L-laminated unit) may be repeatedly superimposed on the L-layer located at the highest position in the alternate laminated material 25 as shown in FIG. 1. The repeated number of the H-L-laminated units is not limited so long as the L-layer is situated at the top position in the H-L-alternate laminated material 25 in the obtained electroconductive film. In this embodiment as shown in FIG. 1, the transparent electroconductive layer 23 can be regarded as one of the H-layers in the alternate laminated material 25.

Figure 2:
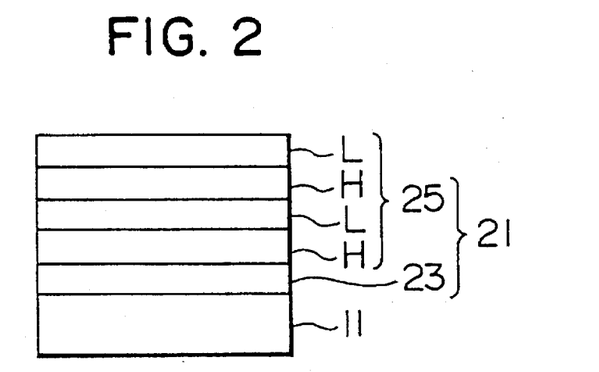

FIG. 2 is a schematic cross-sectional view of a second embodiment of the electroconductive antireflection film according to the present invention.

In an electroconductive antireflection film 21 shown in FIG. 2, a transparent electroconductive layer 23 is formed on a substrate 11, and an alternate laminated material 25 comprising an H-layer and an L-layer is formed on the transparent electroconductive layer 23. In this embodiment, the H-layer, the L-layer, the H-layer and the L-layer are successively overlaid in this order on the transparent electroconductive layer 23. The structure of the electroconductive antireflection film 21 in FIG. 2 is basically the same as that in FIG. 1 except that the H-layer is formed directly on the transparent electroconductive layer 23 in FIG. 2. Similarly to the embodiment in FIG. 1, the H-L-laminated unit consisting of the H-layer and the L-layer may be repeatedly superimposed on the alternate laminated material 25 in the electroconductive antireflection film 21 in FIG. 2. A laminate of the transparent electroconductive layer 23 and the lowest H-layer in the alternate laminated material 25 can be regarded as equivalent to one of the H-layers in the alternate laminated material 25.

Figure 3:
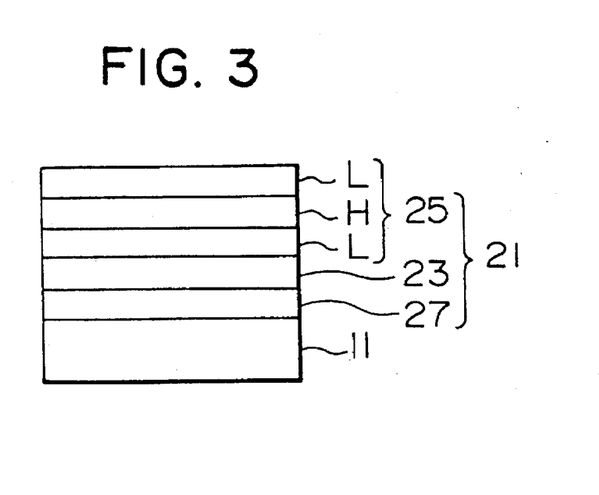

FIG. 3 is a schematic cross-sectional view of a third embodiment of the electroconductive antireflection film according to the present invention.

The structure of an electroconductive antireflection film 21 shown in FIG. 3 is basically the same as that in FIG. 1 except that a dielectric oxide layer 27 is interposed between a substrate 11 and a transparent electroconductive layer 23 in FIG. 3. The refractive index of a dielectric oxide for use in the dielectric oxide layer 27 may be high or low, but it is necessary to determine the refractive index and the thickness of the dielectric oxide layer 27 with the capability of diminishing the light reflection taken into consideration, because the dielectric oxide layer 27 is a constituent of the electroconductive antireflection film 21 according to the present invention. The transparent electroconductive layer 23 is electrically connected via the dielectric oxide layer 27 to a ground electrode (not shown) which is provided on the substrate 11. The dielectric oxide layer 27, which is a constituent of the electroconductive film 21, serves as an undercoat layer for the transparent electroconductive layer 23, thereby improving the adhesion of the transparent electroconductive layer 23 to the substrate 11.

Figure 4:
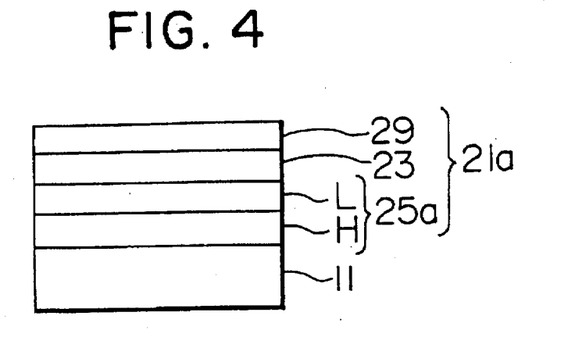

FIG. 4 is a schematic cross-sectional view of a fourth embodiment of the electroconductive antireflection film according to the present invention.

As shown in FIG. 4, an electroconductive antireflection film 21a is provided on a substrate 11. The electroconductive antireflection film 21a comprises an alternate laminated material 25a formed on the substrate 11, a transparent electroconductive layer 23, which is one of the H-layers, formed on the alternate laminated material 25a, and a surface layer 29, which is one of the L-layers, formed on the transparent electroconductive layer 23. In this embodiment, the transparent electroconductive layer 23 is located immediately under the surface layer 29.

An L-layer is overlaid on an H-layer in the alternate laminated material 25a in FIG. 4, and the formation of the H-L-alternate laminated material 25a may be repeatedly provided between the substrate 11 and the transparent electroconductive layer 23 in this embodiment. The repeated number of the H-L-alternate laminated materials 25a is not limited so long as the surface layer 29 is an L-layer and the transparent electroconductive layer 23 is located immediately under the surface layer 29. The transparent electroconductive layer 23 can be regarded as one of the H-layers in the alternate laminated material 25a of the electroconductive antireflection film 21a in FIG. 4.

Figure 5:
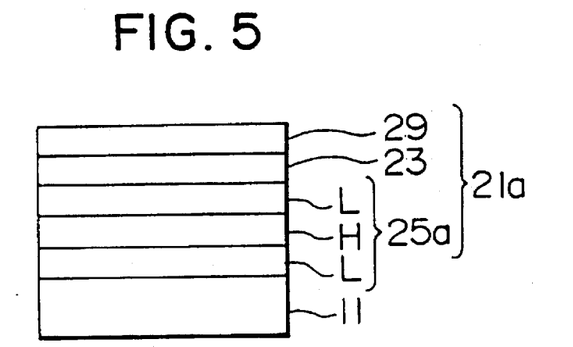

FIG. 5 is a schematic cross-sectional view of a fifth embodiment of the electroconductive antireflection film according to the present invention.

The structure of the electroconductive antireflection film 21a in FIG. 5 is basically the same as that in FIG. 4, except that an alternate laminated material 25a shown in FIG. 5 has three layers, that is, an L-layer, an H-layer and an L-layer which are successively laminated in this order. Similarly to the case of FIG. 4, the formation of an H-L-alternate laminated unit may be repeatedly provided on the alternate laminated material 25a in FIG. 5.

Figure 6:
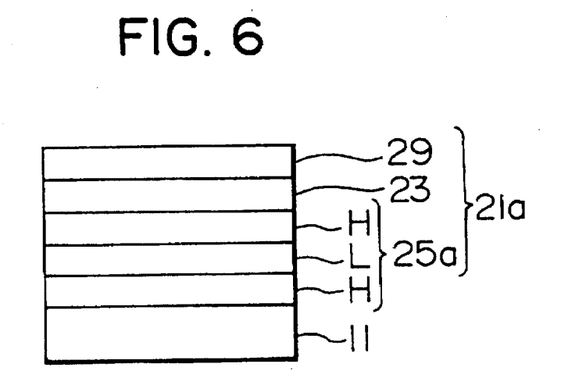

FIG. 6 is a schematic cross-sectional view of a sixth embodiment of the electroconductive antireflection film according to the present invention.

The structure of an electroconductive antireflection film 21a in FIG. 6 is basically the same as that in FIG. 4, except that an alternate laminated material 25a shown in FIG. 6 has three layers, that is, an H-layer, an L-layer and an H-layer which are successively laminated in this order, and a transparent electroconductive layer 23 is therefore formed on the H-layer located at the highest position in the alternate laminated material 25a.

Similarly to the case of FIG. 4, the formation of an H-L-alternate laminated unit may be repeatedly provided on the alternate laminated material 25a in FIG. 6. The laminate of the transparent electroconductive layer 23 and the H-layer located at the highest position in the alternate laminated material 25a can be regarded as equivalent to one of the H-layers in the alternate laminated material 25a.

Examples of a transparent electroconductive material for use in the transparent electroconductive layer 23 include ITO (indium tin oxide), namely, tin-doped indium oxide, Al- or Si-doped ZnO, a composite oxide such as $Cd_2SnO_4$ and tin oxide.

It is preferable to use an oxide with a refractive index of 1.40 to 1.55, for example, silicon dioxide ($SiO_2$), for the low-refractive-index layer (L-layer).

When one of the above-mentioned low-refractive-index layers comprising an oxide such as $SiO_2$ is located at the top position in the electroconductive antireflection film to serve as a surface layer, the following advantages can be obtained:

(1) The surface of the obtained film can be made smooth, so that the stain such as fingerprints can easily be wiped away.
(2) The chemical resistance of the obtained film can be improved.
(3) The change of color with time or depending upon the environmental condition can be minimized because the packing of the film is high even though layers constituting the electroconductive antireflection film are prepared by vacuum deposition.

An oxide with a refractive index ranging from 1.8 to 2.9 is preferably used for the high-refractive-index layer (H-layer). Specific examples of the oxide for use in the H-layer include dielectric oxides such as titanium oxide ($TiO_2$), tantalum oxide ($Ta_2O_5$), hafnium oxide ($HfO_2$), zirconium oxide ($ZrO_2$), a mixture of $TiO_2$ and $Pr_6O_{11}$, and a mixture of $ZrO_2$ and $TiO_2$; and a transparent electroconductive oxide such as ITO. When the H-layers for use in the H-L-alternate laminated material comprise ITO as an oxide with a high refractive index, the electroconductivity can be increased in the obtained antireflection film. However, any other high-refractive-index layers than the transparent electroconductive layer may preferably comprise a dielectric oxide from the viewpoint of the capability of preventing the light reflection. When the rest of the H-layers except the transparent electroconductive layer comprise dielectric oxides, the light reflection preventing characteristics can be obtained over a wide wavelength range, which is favorably compared with the conventionally antireflection film in which all the layers are made of dielectric materials.

To design the structure of layers constituting the electroconductive antireflection film according to the present invention, the wavelength peaks to be mainly subjected to the decrease of reflectance are determined, and the transparent electroconductive materials and the oxides with a high refractive index and a low refractive index respectively for the high-refractive-index layers and the low-refractive-index layers may be selected depending upon the above-mentioned target of the wavelength. Then, the optimal thickness of each layer can be judged from the refractive index of each material for use in each layer and the number of laminated layers.

Tables 1 through 9 show the design criteria for the electroconductive antireflection film according to the present invention.

In the electroconductive antireflection films (I) to (IX) of the present invention shown in Tables 1 to 9, the first layer is directly formed on a glass substrate (Bk7) with a refractive index of 1.515, and other layers are successively overlaid on the first layer in that order.

TABLE 1

Structure of Electroconductive Antireflection Film (I)

| Layers | Material | Refractive Index | Thickness (nm) |
|---|---|---|---|
| First layer | ITO | 1.977 | 23.43 |
| Second layer | $SiO_2$ | 1.513 | 31.58 |
| Third layer | $TiO_2$ | 2.603 | 95.93 |
| Fourth layer | $SiO_2$ | 1.513 | 83.57 |

Figure 7:
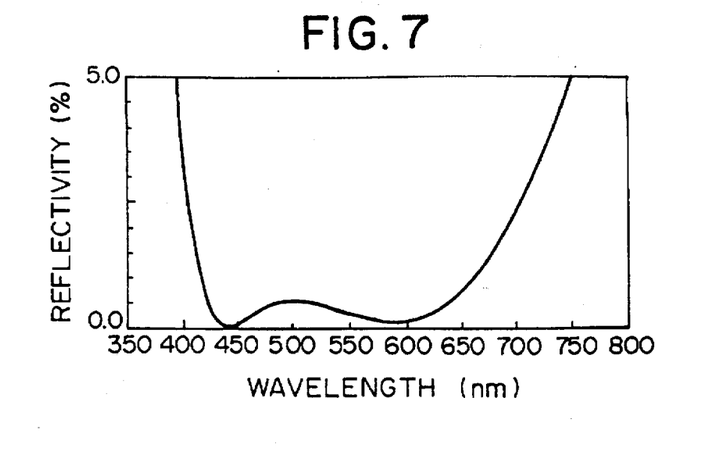
FIGS. 7 through 15 are graphs showing the spectral reflectance characteristics of electroconductive antireflection films of the present invention.

The spectral reflectance characteristics of this film is shown in FIG. 7.

TABLE 2

Structure of Electroconductive Antireflection Film (II)

| Layers | Material | Refractive Index | Thickness (nm) |
|---|---|---|---|
| First layer | ITO | 1.977 | 12.38 |
| Second layer | $TiO_2$ | 2.603 | 6.32 |
| Third layer | $SiO_2$ | 1.513 | 31.89 |
| Fourth layer | $TiO_2$ | 2.603 | 98.86 |
| Fifth layer | $SiO_2$ | 1.513 | 84.35 |

Figure 8:
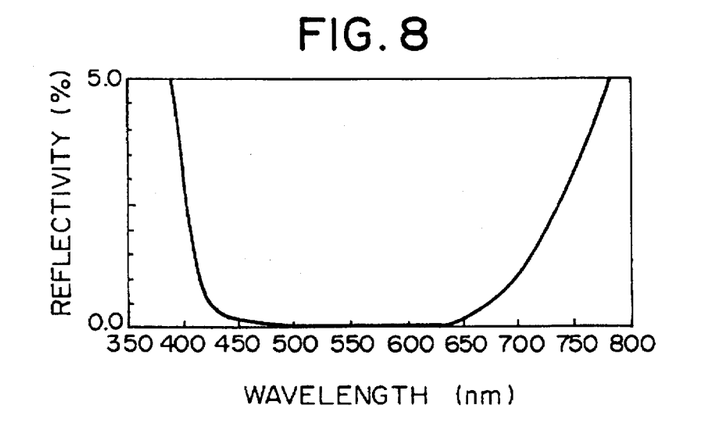

The spectral reflectance characteristics of this film is shown in FIG. 8.

TABLE 3

Structure of Electroconductive Antireflection Film (III)

| Layers | Material | Refractive Index | Thickness (nm) |
|---|---|---|---|
| First Layer | ITO | 1.977 | 14.97 |
| Second layer | $SiO_2$ | 1.513 | 35.57 |
| Third layer | $TiO_2$ | 2.603 | 21.20 |
| Fourth layer | $SiO_2$ | 1.513 | 30.32 |
| Fifth layer | $TiO_2$ | 2.603 | 24.79 |
| Sixth layer | $SiO_2$ | 1.513 | 96.51 |

Figure 9:
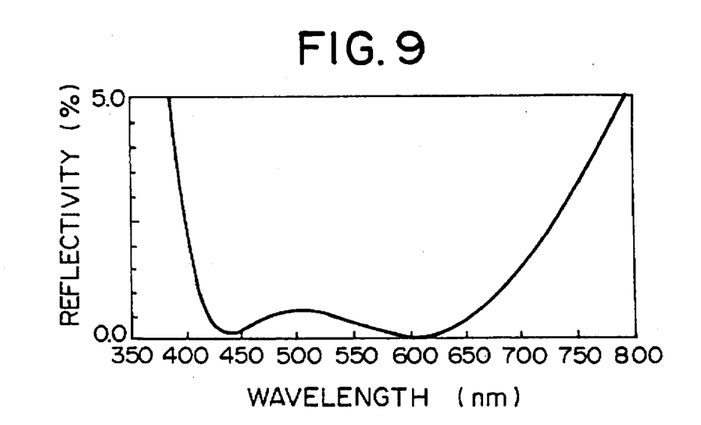

The spectral reflectance characteristics of this film is shown in FIG. 9.

TABLE 4

Structure of Electroconductive Antireflection Film (IV)

| Layers | Material | Refractive Index | Thickness (nm) |
|---|---|---|---|
| First layer | ITO | 1.977 | 12.02 |
| Second layer | $TiO_2$ | 2.603 | 6.27 |
| Third layer | $SiO_2$ | 1.513 | 31.12 |
| Fourth layer | $TiO_2$ | 2.603 | 74.81 |
| Fifth layer | $SiO_2$ | 1.513 | 1.41 |
| Sixth layer | $TiO_2$ | 2.603 | 22.08 |
| Seventh layer | $SiO_2$ | 1.513 | 83.06 |

Figure 10:
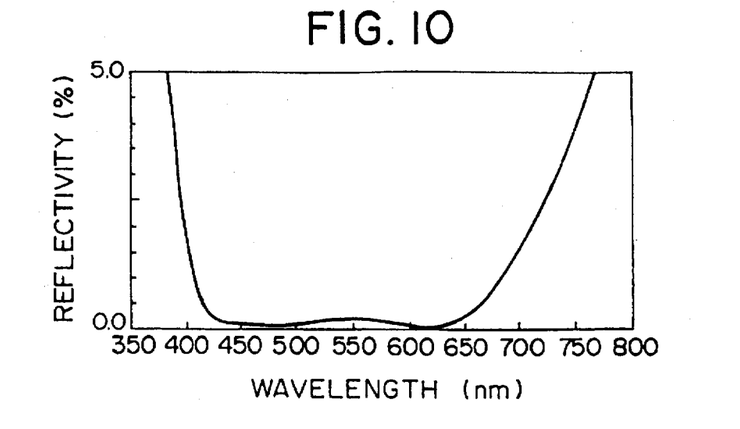

The spectral reflectance characteristics of this film is shown in FIG. 10.

TABLE 5

Structure of Electroconductive Antireflection Film (V)

| Layers | Material | Refractive Index | Thickness (nm) |
|---|---|---|---|
| First layer | ITO | 1.977 | 7.61 |
| Second layer | $SiO_2$ | 1.513 | 34.80 |
| Third layer | $TiO_2$ | 2.603 | 7.56 |
| Fourth layer | $SiO_2$ | 1.513 | 36.16 |
| Fifth layer | $TiO_2$ | 2.603 | 26.52 |
| Sixth layer | $SiO_2$ | 1.513 | 27.98 |
| Seventh layer | $TiO_2$ | 2.603 | 26.05 |
| Eighth layer | $SiO_2$ | 1.513 | 97.66 |

Figure 11:
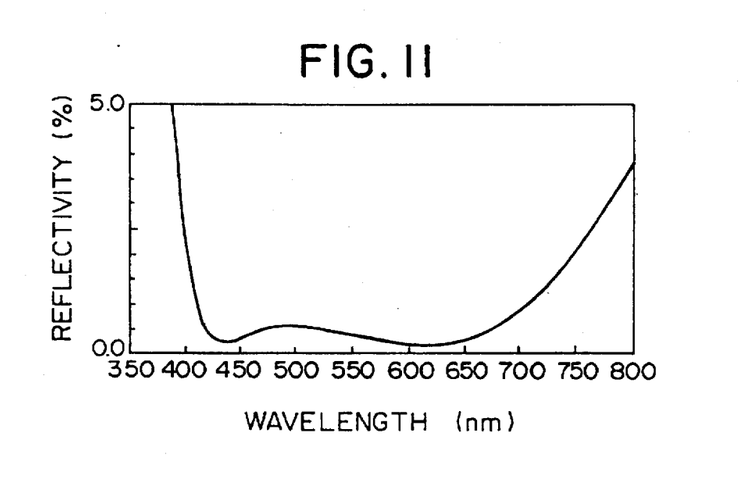

The spectral reflectance characteristics of this film is shown in FIG. 11.

TABLE 6

Structure of Electroconductive
Antireflection Film (VI)

| Layers | Material | Refractive Index | Thickness (nm) |
| --- | --- | --- | --- |
| First layer | $SiO_2$ | 1.460 | 307.79 |
| Second layer | ITO | 2.000 | 159.31 |
| Third layer | $SiO_2$ | 1.460 | 168.95 |
| Fourth layer | $TiO_2$ | 2.500 | 1039.72 |
| Fifth layer | $SiO_2$ | 1.460 | 507.04 |

Figure 12:
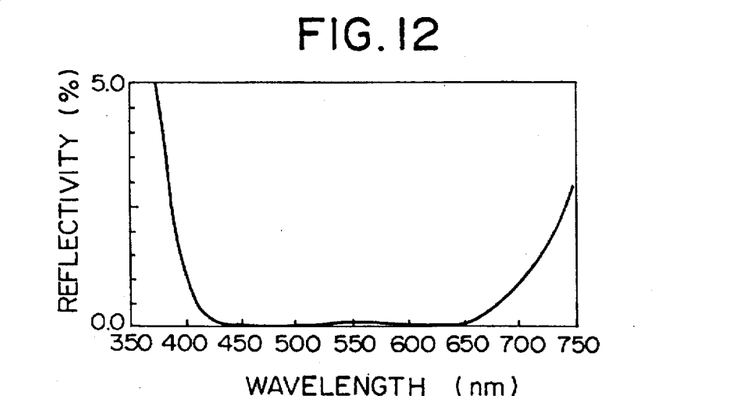

The spectral reflectance characteristics of this film is shown in FIG. 12.

TABLE 7

Structure of Electroconductive
Antireflection Film (VII)

| Layers | Material | Refractive Index | Thickness (nm) |
| --- | --- | --- | --- |
| First layer | $TiO_2$ | 2.603 | 9.63 |
| Second layer | $SiO_2$ | 1.513 | 34.61 |
| Third layer | $TiO_2$ | 2.603 | 94.80 |
| Fourth layer | ITO | 1.977 | 7.17 |
| Fifth layer | $SiO_2$ | 1.513 | 79.51 |

Figure 13:
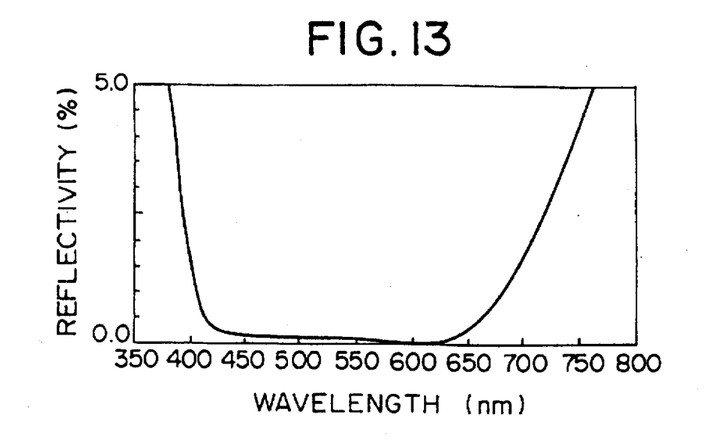

The spectral reflectance characteristics of this film is shown in FIG. 13.

TABLE 8

Structure of Electroconductive
Antireflection Film (VIII)

| Layers | Material | Refractive Index | Thickness (nm) |
| --- | --- | --- | --- |
| First layer | $TiO_2$ | 2.603 | 9.63 |
| Second layer | $SiO_2$ | 1.513 | 34.61 |
| Third layer | $TiO_2$ | 2.603 | 76.98 |
| Fourth layer | $SiO_2$ | 1.513 | 1.09 |
| Fifth layer | $TiO_2$ | 2.603 | 17.93 |
| Sixth layer | ITO | 1.977 | 7.17 |
| Seventh layer | $SiO_2$ | 1.513 | 79.51 |

Figure 14:
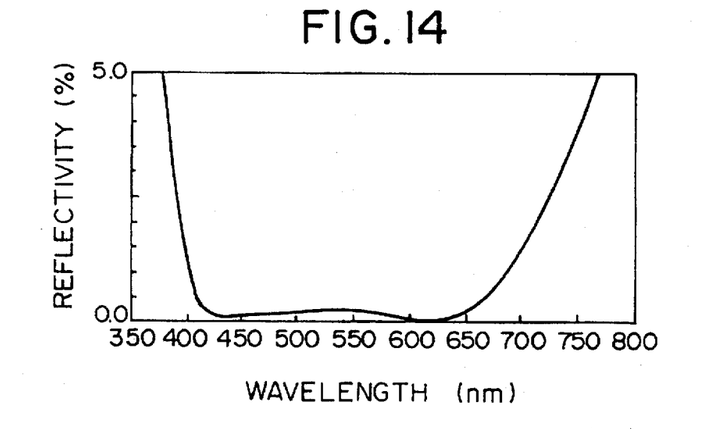

The spectral reflectance characteristics of this film is shown in FIG. 14.

TABLE 9

Structure of Electroconductive
Antireflection Film (IX)

| Layers | Material | Refractive Index | Thickness (nm) |
| --- | --- | --- | --- |
| First layer | $TiO_2$ | 2.603 | 9.63 |
| Second layer | $SiO_2$ | 1.513 | 34.61 |
| Third layer | $TiO_2$ | 2.603 | 79.98 |
| Fourth layer | $SiO_2$ | 1.513 | 1.09 |
| Fifth layer | $TiO_2$ | 2.603 | 17.93 |
| Sixth layer | $SiO_2$ | 1.513 | 1.00 |
| Seventh layer | ITO | 1.977 | 7.20 |
| Eighth layer | $SiO_2$ | 1.513 | 79.50 |

Figure 15:
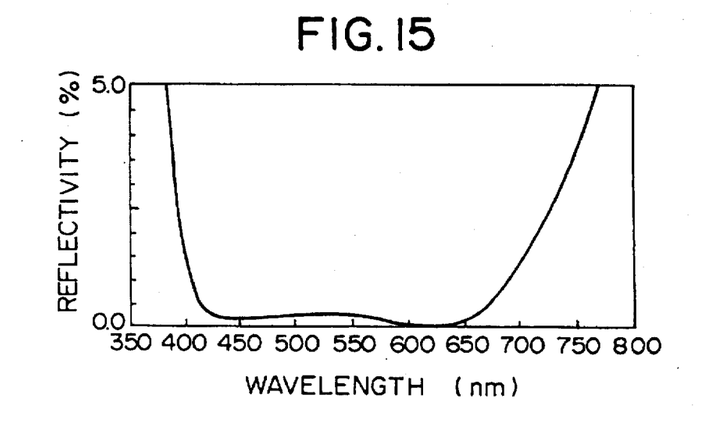

The spectral reflectance characteristics of this film is shown in FIG. 15.

In the previously mentioned embodiments of the electroconductive antireflection film, the transparent electroconductive layer 23 is formed just on the substrate 11 or immediately under the surface layer, and the electroconductive film comprises the alternate laminated material of the H-layers and the L-layers, including the transparent electroconductive layer (the H-layer) and the surface layer (the L-layer). The structure of the electroconductive antireflection film of the present invention is not limited to the above-mentioned embodiments so long as the film comprises at least four oxide layers comprising the high-refractive-index layers (H-layers) and the low-refractive-index layers (L-layers), and at least one of the high-refractive-index layers serves as a transparent electroconductive layer.

The electroconductive antireflection film of the present invention can be prepared by conventional vacuum deposition, but it is desirable that all oxide layers be prepared in the atmosphere of plasma in accordance with a thin layer forming method. In other words, all the layers constituting the electroconductive film of the present invention can be formed in the atmosphere of plasma because all layers comprise oxides. In the case where a low-refractive-index layer is formed in the plasma using a material of $MgF_2$, which is recommendably used for the conventional low-refractive-index layer, some light absorption characteristics are generated in the obtained layer, so that the light transmission properties of the layer deteriorate. In contrast to this, no light absorption is generated in the layer when the thin layer is formed in the plasma using an oxide such as $SiO_2$.

When all layers constituting the electroconductive antireflection film of the present invention are formed in the plasma, the following effects are further improved as compared with the case where the layers are prepared by the conventional vacuum deposition not using the plasma:

(1) The change in spectral reflectance characteristics of the film depending on the environmental condition can be minimized. Therefore, the light reflected from the film can be maintained constant regardless of the operating environmental condition such as humidity.

(2) The wear resistance of the obtained film can be improved, so that the film does not take scratches when wiped or rubbed.

(3) The surface of the obtained film can be made smooth, so that the fingerprints attached to the surface of the film can easily be wiped away.

For example, the sputtering method, the ion plating method by which a material to be deposited is ionized and deposited on a substrate by RF discharge using the RF coil, and the ion-beam-assisted deposition method by which a material is vacuum-deposited on a substrate with the ion beam being applied from a material source to the substrate are available in the present invention as the thin layer forming method using the plasma.

Other features of this invention will become apparent in the course of the following description of exemplary embodiments which are given for illustration of the invention and are not intended to be limiting thereof.

EXAMPLE 1

The following three kinds of targets, ITO, $TiO_2$ and $SiO_2$ were placed in a magnetron sputtering apparatus equipped with a mechanism for transporting a glass substrate to a predetermined position between the targets.

The glass substrate (Bk7) was set in a vacuum vessel and the vessel was further evacuated under pressure of $1 \times 10^5$ Torr or less, and the sputtering pressure was controlled to $2 \times 10^5$ Torr by the introduction of oxygen-containing argon gas into the vessel. The targets were sputtered to the substrate one by one as the substrate was heated. Thus, an electroconductive antireflection film of the present invention with a laminated structure of eight layers (ITO - $SiO_2$ - $TiO_2$ -$SiO_2$ - $TiO_2$ - $SiO_2$ - $TiO_2$ - $SiO_2$) as shown in Table 5 was provided on the glass substrate (Bk7).

The thus prepared electroconductive antireflection film of the present invention was not impaired in the abrasion test, which proved the electroconductive film to have excellent wear resistance. In addition, the fingerprints attached to the surface of the electroconductive antireflection film were easily wiped out with a dry cloth.

Furthermore, the glass substrate (Bk7) covered with the above prepared electroconductive antireflection film was placed in a temperature-and-humidity-controlled bath. The lights reflected from the glass substrate were observed with the naked eyes under the circumstances of low temperature and low humidity of 10° C. and 20% RH, and high temperature and high humidity of 35° C. and 80% RH. As a result, there was no change in color between the above-mentioned two conditions.

EXAMPLE 2

The procedure for preparation of the electroconductive antireflection film in Example 1 was repeated except that the sputtering order of the same oxides (ITO, $SiO_2$, and $TiO_2$) as used in Example 1 was changed, so that an electroconductive antireflection film of the present invention with a laminated structure of eight layers ($TiO_2$ - $SiO_2$ - $TiO_2$ - $SiO_2$ - $TiO_2$ - $SiO_2$ - ITO - $SiO_2$) as shown in Table 9 was provided on the glass substrate (Bk7).

The thus prepared electroconductive antireflection film of the present invention was not impaired in the abrasion test, which proved the electroconductive film to have excellent wear resistance. In addition, the fingerprints attached to the surface of the electroconductive antireflection film were easily wiped out with a dry cloth.

Furthermore, the glass substrate covered with the above prepared electroconductive antireflection film was placed in a temperature-and-humidity-controlled bath. The lights reflected from the glass substrate were observed with the naked eyes under the circumstances of low temperature and low humidity of 10° C. and 20% RH, and high temperature and high humidity of 35° C. and 80% RH. As a result, there was no change in color between the above-mentioned two conditions.

What is claimed is:

1. An electroconductive antireflection film having a laminated structure, comprising:

a substrate, a transparent electroconductive layer comprising indium tin oxide disposed adjacent the substrate, at least two first oxide layers having a refractive index within a first range, at least two second oxide layers having a refractive index within a second range, the second range being lower than the first range, the at least two first oxide layers and the at least two second oxide layers comprising oxide layers prepared by a sputtering method and being disposed in an alternating arrangement, at least one of the two first oxide layers comprising titanium oxide disposed adjacent the transparent electron conductive layer, at least one of the two second oxide layers comprising silicon oxide disposed adjacent the at least one of the two first oxide layers comprising titanium oxide, and at least one of the at least two second oxide layers comprising a surface layer of the electroconductive antireflection film.

2. The film of claim 1, wherein the first range is between about 1.8 and about 2.9 and the second range is between about 1.40 and about 1.55.

3. The film of claim 1, comprising a ground electrode provided on the surface layer, wherein the transparent electroconductive layer is electrically connected via the surface layer to the ground electrode.

* * * * *